United States Patent
Lockhart et al.

(10) Patent No.: US 8,652,629 B2
(45) Date of Patent: Feb. 18, 2014

(54) TRANSMISSION CROSS ARM

(75) Inventors: Grant Robert Lockhart, Maple Ridge (CA); Janos Csaba Toth, Vancouver (CA); Ralph Walter Ulm, Burnaby (CA); Adelana Gilpin-Jackson, Port Coquitlam (CA)

(73) Assignees: FRP Transmission Innovations Inc., Maple Ridge BC (CA); British Columbia Hydro and Power Authority, Vancouver BC (CA)

( * ) Notice: Subject to any disclaimer, the term of this patent is extended or adjusted under 35 U.S.C. 154(b) by 261 days.

(21) Appl. No.: 12/873,163

(22) Filed: Aug. 31, 2010

(65) Prior Publication Data

US 2012/0048613 A1 Mar. 1, 2012

(51) Int. Cl.
*B32B 17/02* (2006.01)

(52) U.S. Cl.
USPC .............. 428/299.4; 428/113; 174/45 R

(58) Field of Classification Search
USPC .............. 174/45; 428/73, 107, 109, 110, 111, 428/113, 298.1, 299.4; 442/204
See application file for complete search history.

(56) References Cited

U.S. PATENT DOCUMENTS

| | | | | |
|---|---|---|---|---|
| 3,603,717 | A * | 9/1971 | Scott .......................... | 174/45 R |
| 3,666,711 | A | 5/1972 | Morris | |
| 4,262,047 | A * | 4/1981 | Barnett et al. .................. | 428/73 |
| 4,271,229 | A | 6/1981 | Temple | |
| 4,690,850 | A * | 9/1987 | Fezio ........................... | 428/105 |
| 4,786,541 | A * | 11/1988 | Nishimura et al. ........... | 428/102 |
| 4,812,343 | A * | 3/1989 | Kiekhaefer et al. ......... | 428/35.6 |
| 4,950,532 | A * | 8/1990 | Das et al. ..................... | 264/257 |
| 5,100,713 | A * | 3/1992 | Homma et al. ............... | 428/102 |
| 5,326,410 | A * | 7/1994 | Boyles .......................... | 156/71 |
| 5,648,169 | A * | 7/1997 | Thimons et al. .............. | 428/391 |
| 5,905,045 | A * | 5/1999 | Vockel et al. .................... | 442/43 |
| 6,559,306 | B2 * | 5/2003 | Kaul et al. ..................... | 544/233 |
| 7,829,164 | B2 * | 11/2010 | Castellani et al. ........... | 428/36.9 |
| 7,930,907 | B2 * | 4/2011 | Dunn et al. ..................... | 66/202 |
| 8,105,523 | B2 * | 1/2012 | Edelmann et al. ............ | 264/258 |
| 8,207,286 | B2 * | 6/2012 | Rukavina et al. .............. | 528/85 |
| 2007/0113759 | A1 * | 5/2007 | Roth et al. .................... | 108/161 |
| 2008/0160282 | A1 * | 7/2008 | Woolstencroft ........... | 428/301.4 |
| 2009/0131556 | A1 * | 5/2009 | Honda et al. .................. | 523/207 |

FOREIGN PATENT DOCUMENTS

| | | |
|---|---|---|
| CN | 2499966 Y | 7/2002 |
| CN | 201117371 Y | 9/2008 |
| GB | 562900 | 7/1944 |

OTHER PUBLICATIONS

VectorPly E-TTXM4008 Specifications dated Feb. 28, 2008 and website http://www.vectorply.com/pdf/e-ttxm%204008.pdf.*
International Search Report for Application PCT/CA2010/001361, mailed May 4, 2011, 3 pages.
Written Opinion of the International Searching Authority for Application PCT/CA2010/001361, mailed May 4, 2011, 3 pages.

* cited by examiner

*Primary Examiner* — Boris L. Chervinsky
*Assistant Examiner* — Pete Lee
(74) *Attorney, Agent, or Firm* — Schwabe, Williamson & Wyatt

(57) ABSTRACT

A cross arm is provided, for use in a support structure for conductors within an electrical grid. The cross arm is made of weather resistant glass fiber reinforced two component polyurethane based polymers and has a "C" cross sectional shape typically arranged in a double configuration. Pairs of the cross arms are attached to utility poles in a parallel position on opposite sides of the utility pole to meet predefined design conditions. Alternatively, a single cross arm may be attached to a utility pole.

20 Claims, 9 Drawing Sheets

_US 8,652,629 B2_

TRANSMISSION CROSS ARM

TECHNICAL FIELD

The present embodiments relate to the field of cross arms for use in the power transmission industry.

BACKGROUND

Cross arms are used throughout the world as structural elements to support electrical power transmission lines above the ground. These transmission cross arms, normally between 6 to 14 m in length, can be made of a variety of materials, the most common of which is treated wood.

The service life of cross arms is a very important factor. Given the difficulties of reaching and replacing the cross arms (which may be in very remote locations), the cost of replacing a cross arm often exceeds that of the cost of the cross arm, itself.

The use of timber cross arms poses certain challenges. Good quality timber for use in the cross arm is becoming increasing difficult to obtain given diminishing old growth forests, which is the prime timber source, as well as the impact of modern environmental laws.

Timber cross arms also have a limited life span (typically about 25 years) and decay naturally. The life span of timber cross arms may be enhanced by the use of wood preservatives, such as Creosote, Penta and CCA, however, these preservatives are not environmentally friendly, and may be toxic. In particular, many wood preservative treated wood products are banned for use in certain areas or industries.

Further, it is difficult to determine the state of a timber cross arm in service and assess the remaining life through visual inspection. Defect in timber due to insects and pests, moistness and/or temperature of the ambient surroundings of the timber, may be hidden and lead to costly asset failures and electrical system outages.

Timber cross arms are combustible and propagate fire rapidly in forest fires; they are attractive to woodpeckers; and, under certain weather conditions, such as lightening, for example, they can initiate a pole top fire leading to electrical system outages. Timber cross arms also creep (e.g. deflect) under heavy loads sustained for long periods of time.

There have been several attempts to overcome these difficulties by substituting timber with other materials. Despite these attempts, timber remains the primary source of cross arms in the power transmission industry.

Metal, particularly galvanized steel cross arms, have been used in order to overcome some of the disadvantages of timber. The primary disadvantage of using a metal cross arm is its electrical conductivity, which makes the cross arm very dangerous for transmission line technicians (or linemen) to work with on energized live lines. The galvanized coating of such cross arms has a life expectancy of about 25 years, after which the cross arm is susceptible to corrosion. In addition the commonly used steel sections are heavy and require significant lifting capacity in the field to install them. For these reasons, metal cross arms are not widely used.

Laminated timber has also been used for cross arms. Laminated timber is coated with a protective coating in order to generally prevent moisture penetration and increase the life expectancy of the cross arm. Some coatings are environmentally unfriendly, and may leach into the surrounding environment. Further, moisture and cracks may cause delamination of the timber. Under many circumstances, such cross arms may have a lower life expectancy than untreated timber.

Concrete, while commonly used as a building material, has not proven suitable for use as a cross arm. Concrete has large capillarity porosity, which allows water to penetrate and can cause the concrete to crack in freezing and thawing cycles. Unreinforced concrete will crack under tension stress. Regular concrete without reinforcement is quite brittle, and lacks ductility, which is a problem when used as a long cross arm. Given the different load conditions in electrical transmission lines (load due to the weight of conductors, insulators, radial ice on conductors, wind on conductors) the cross arm requires ductility, i.e. the ability of the material to plastically deform while continuing to carry loads without fracture, even after micro cracking. Also, concrete is not easily usable with thin sections of a cross arm. A cross arm made of concrete would be large, bulky, heavy and would require steel reinforcement for structural bending capacity and stirrups for shear reinforcement. For at least the above reasons concrete has not generally been used for cross arms across the transmission industry.

SUMMARY

In an aspect, there is provided herein a transmission class structural cross arm, including: a C-channel comprising a glass fibre reinforced polymer with UV inhibitors.

In another aspect, there is provided herein a support structure for a conductor, including: a) at least one utility pole; a) a first cross arm comprised of glass fibre reinforced polymer, coupled to the at least one utility pole; b) a second cross arm comprised of glass fibre reinforced polymer, coupled to the at least one utility pole, on the opposite side of the pole; wherein the first cross arm and the second cross arm are provided in a back-to-back arrangement and the conductor is supported between the first cross arm and the second cross arm.

DRAWINGS

The following figures set forth embodiments in which like reference numerals denote like parts. Embodiments are illustrated by way of example and not by way of limitation in the accompanying figures.

DETAILED DESCRIPTION

Figure 1:
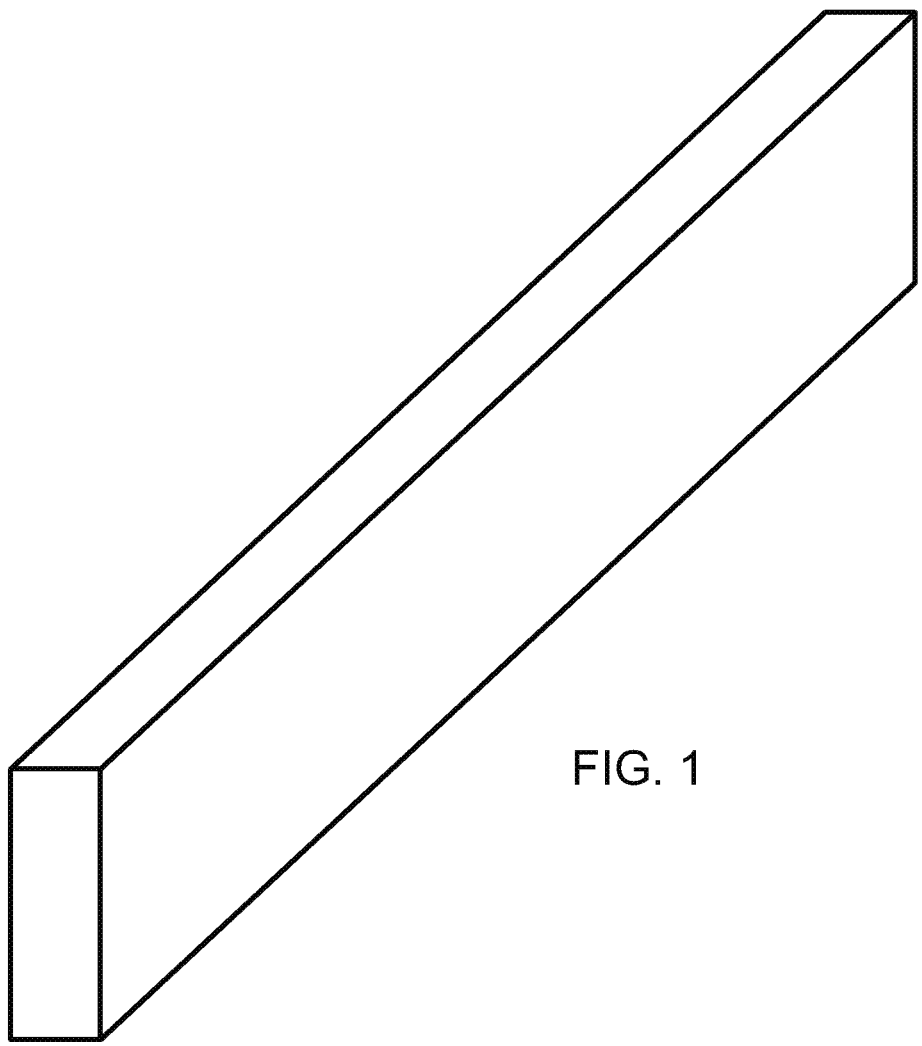
FIG. 1 is an isometric view of a timber cross arm as known in the prior art.
Figure 2:
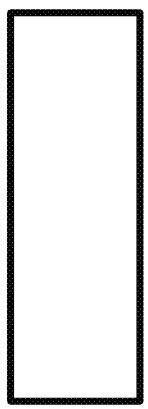
FIG. 2 is a cross sectional view of the cross arm of FIG. 1.

Referring to FIGS. 1 and 2, cross arms of the prior art are generally shown. In general, cross arms are coupled to utility poles in order to provide support for conductors, in an electrical transmission grid. As shown, prior art cross arms may be solid and include a rectangular cross section, or may include a solid rectangular exterior with a hollow interior.

Figure 3:
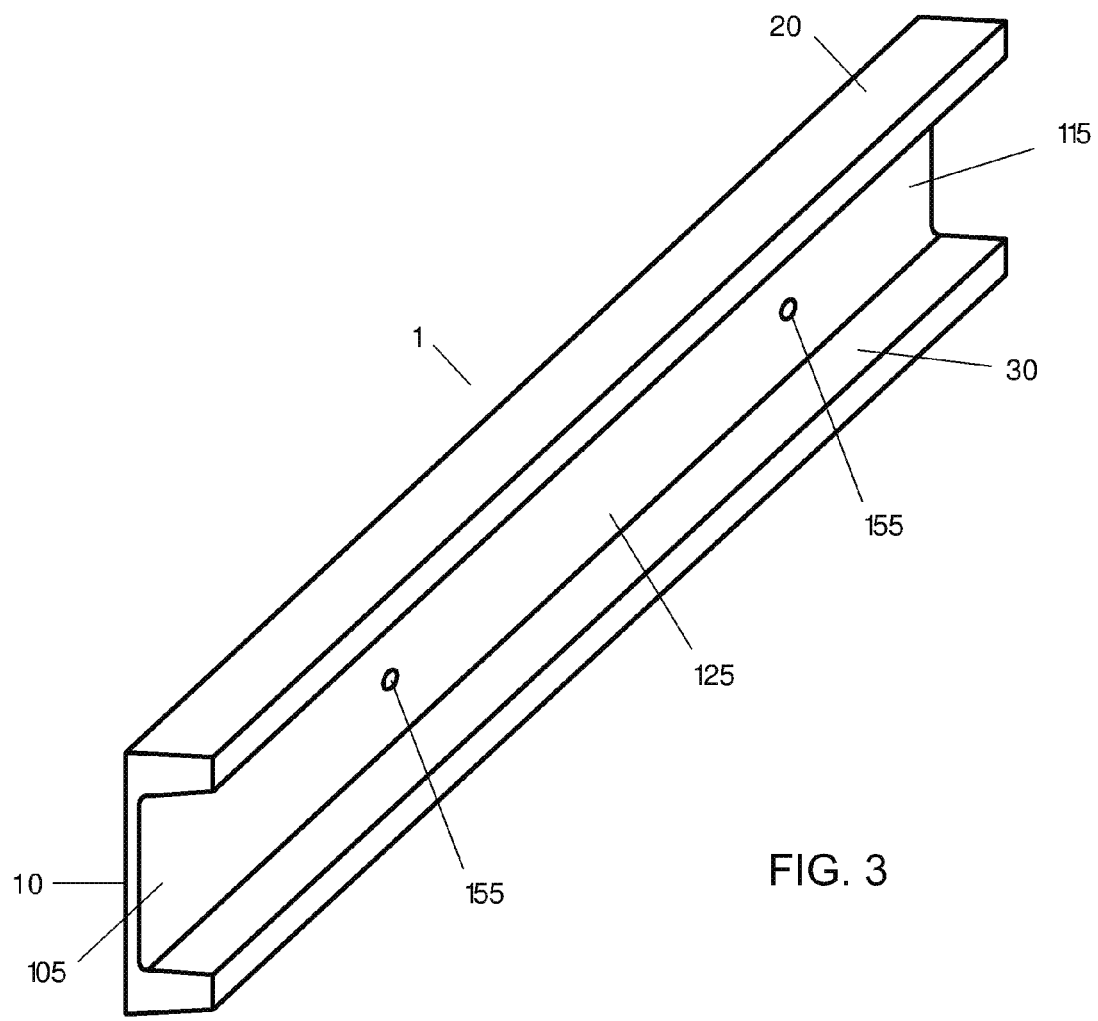
FIG. 3 is an isometric view of a glass fibre reinforced polymer cross arm according to an embodiment.
Figure 4:
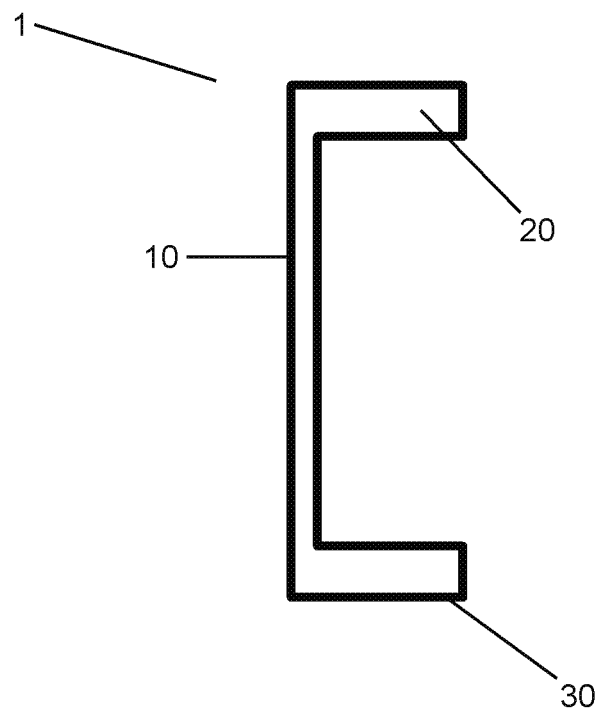
FIG. 4 is a cross sectional view of an embodiment of a cross arm.
Figure 5:
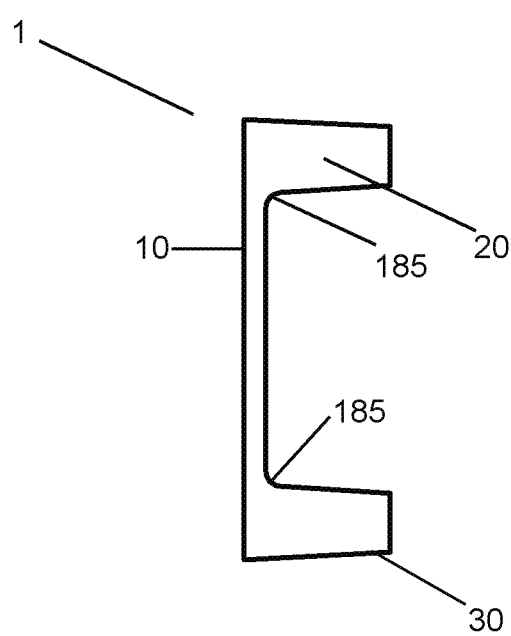
FIG. 5 is a cross sectional view of another embodiment of a cross arm.

Referring to FIGS. 3, 4 and 5, a cross arm 1 according to an embodiment is generally shown. The cross arm 1 is a transmission class structural cross arm and has a generally C-shaped cross-section. The cross arm 1 is made of glass fibre reinforced polymer. The cross arm 1 includes a rectangular back member 10, a top extension 20 and a bottom extension 30. The cross arm 1 includes a first end 105, a second end 115 and a middle 125. The top and bottom flanges 20, 30 are provided along the length of cross arm 1 to provide additional strength. The top flange 20 extends from a top edge of back member 10. Similarly, the bottom flange 30 extends from a bottom edge of back member 10.

In the embodiment of FIGS. 3 and 5, top and bottom flanges 20, 30 extend from the back member 10. Both the top and bottom flanges 20, 30 are tapered slightly and fillets 185 are provided where the top and bottom flanges 20, 30 meet the back member 10.

In the embodiment of FIG. 4, top and bottom flanges 20, 30 extend generally perpendicularly from back member 10. Further, the top and bottom flanges 20, 30 are untapered and the fillets are not present.

Figure 6:
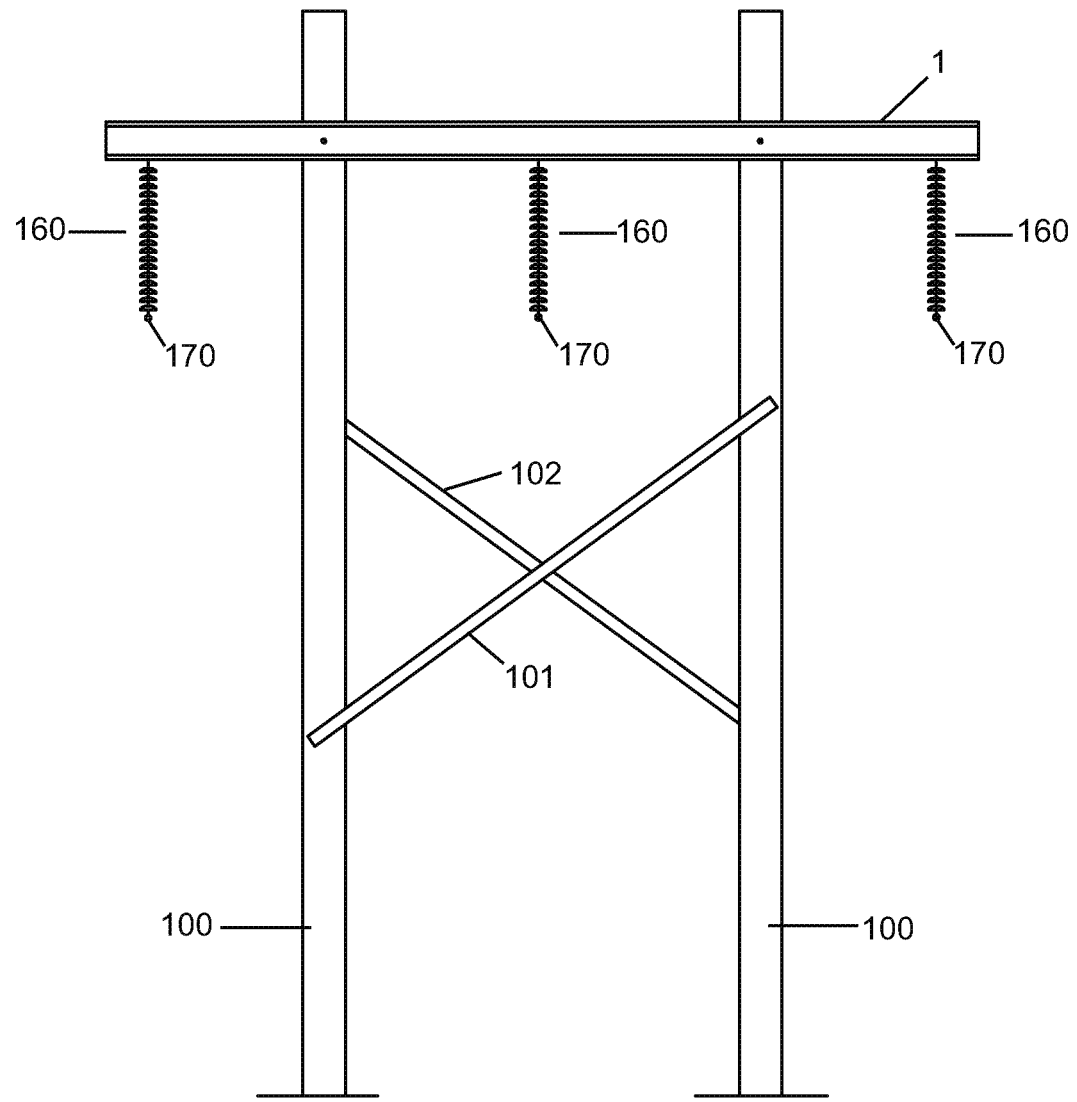
FIG. 6 is a front view showing a cross arm installed between two utility poles.

The function of the cross arm 1 is to support conductors within a frame, such as an "H-frame", for example, which is shown in FIG. 6. In H-frames, the cross arm 1 extends between two utility poles 100 to support conductors 170, which are typically suspended from the cross arm 1 near ends 105 and 115 and at middle 125, as shown. Cross braces 101, 102, which may be coupled to opposite sides of the utility poles 100, may further be provided to support the H-frame.

Figure 7:
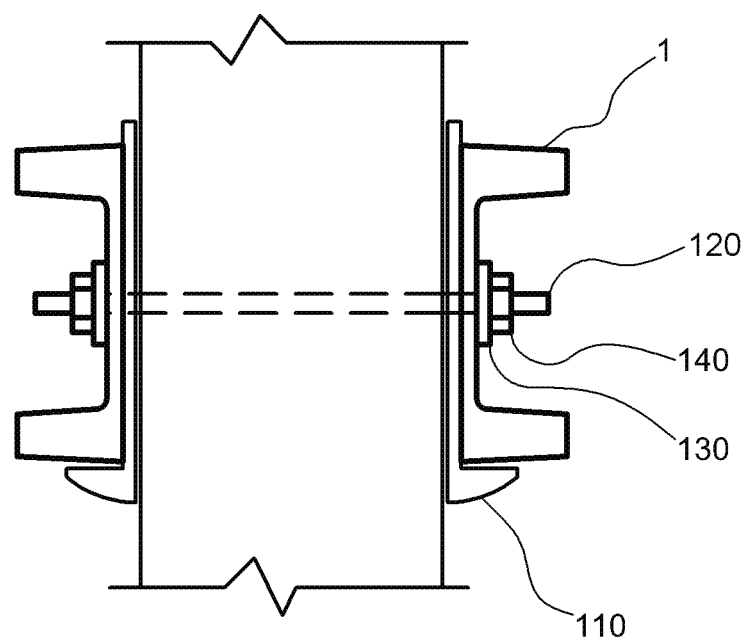
FIG. 7 is a side sectional view of a portion of FIG. 6 showing a pair of cross arms coupled to a utility pole.

The back member 10 of the cross arm 1 abuts the utility pole 100 when installed. Referring to the embodiment of FIG. 7, pair of cross arms 1 are provided back-to-back on opposite sides of the utility pole 100. The cross arms 1 are coupled to utility poles 100 by rods 120, which may be made of galvanized steel and include threads. As shown, the rod 120 extends through aperture 155 of a first cross arm 1, through the utility pole 100 and through aperture 155 of a second cross arm 1. Rods 120 are secured in place by a washer 130 and a nut 140, which is threaded onto the rod 120, however, another suitable securing arrangement may alternatively be used. A bracket 110 may be provided between the cross arm 1 and the utility pole 100 to provide additional support to the cross arm 1.

Figure 8:
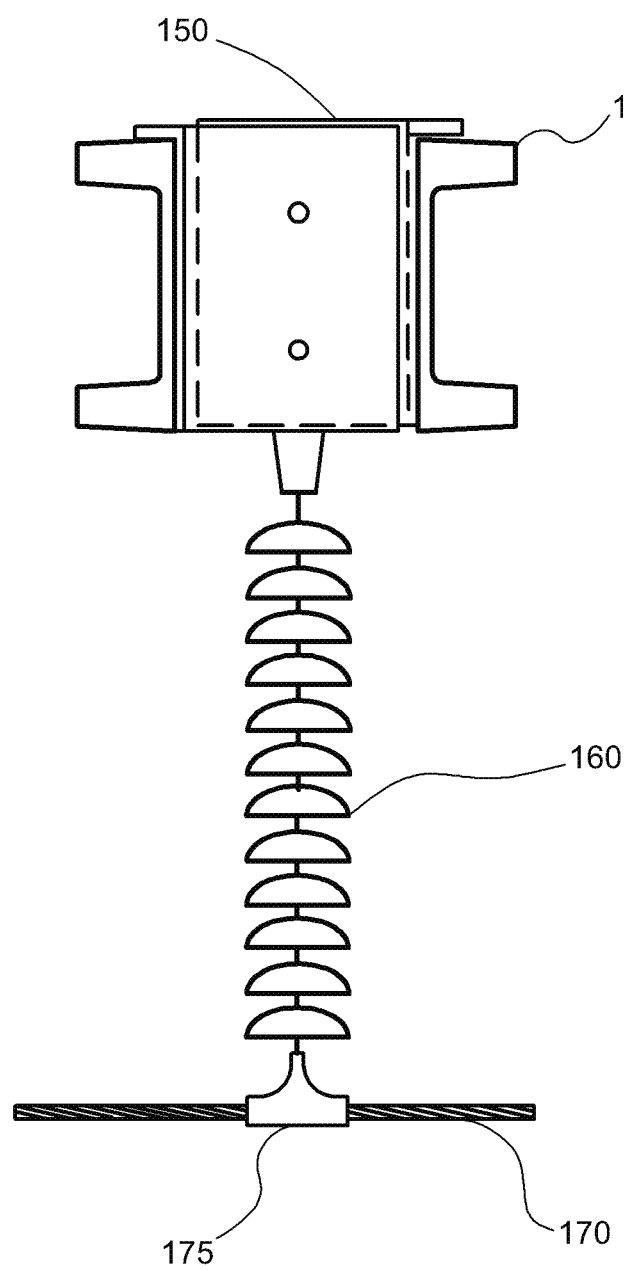
FIG. 8 is a side sectional view showing cross arms supporting a conductor.

As shown in FIG. 8, a hardware component 150 is provided to support conductors 170. The hardware component 150 includes flanges, which extend outwardly at a top end thereof. The flanges are sized to abut both cross arms 1 so that the hardware component 150 is supported between the cross arms 1. An insulator 160 hangs from the hardware component 150 and the conductor 170 is coupled to the insulator 160 by a clamp 175.

Figure 9:
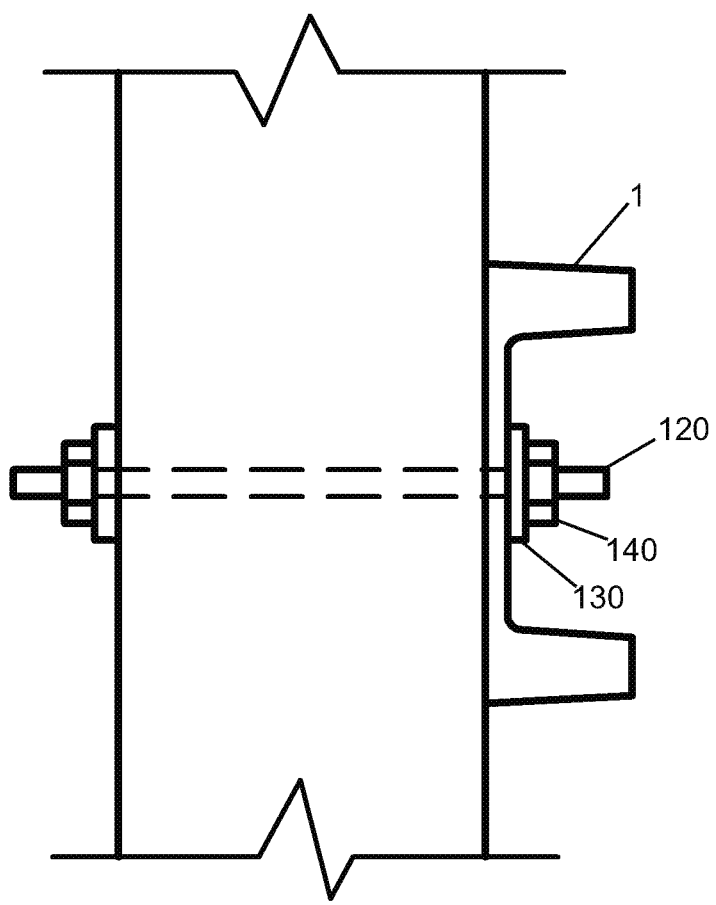
FIG. 9 is a side sectional view of single cross arm coupled to a utility pole.
Figure 10:
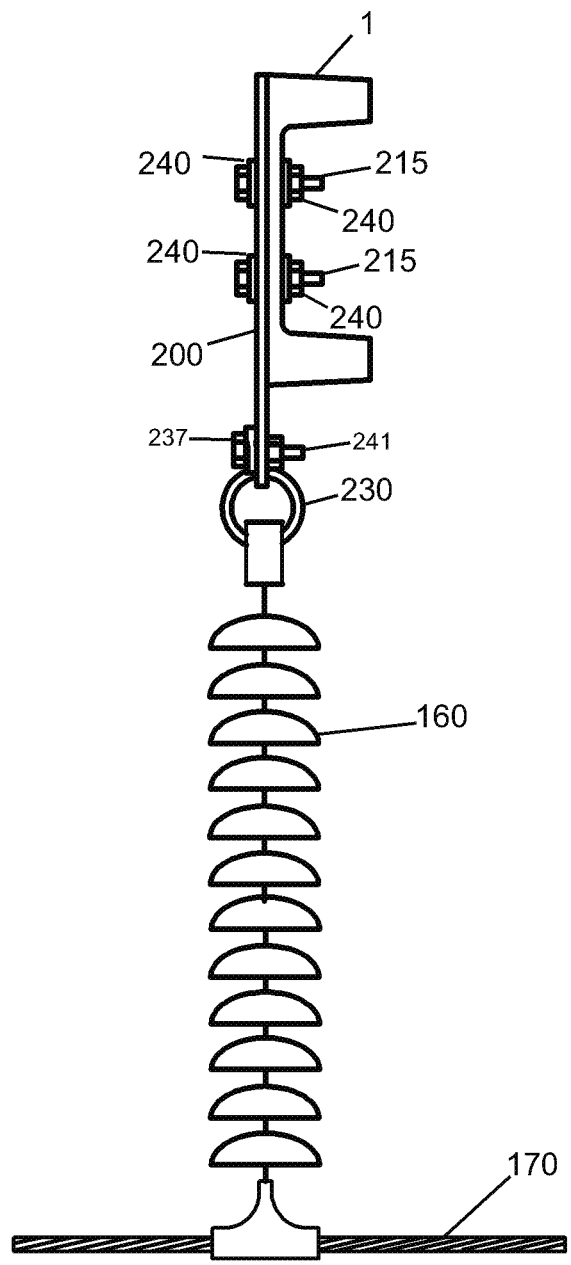
FIG. 10 is a side sectional view of a single cross arm supporting a conductor.

In another embodiment, which is shown in FIGS. 9 and 10, a single cross arm 1 is provided between utility poles 100. The single cross arm 1 is secured to the utility poles 100 in a similar manner as has been described with respect to the back-to-back arrangement of FIG. 7. In this embodiment, a plate 200, which is secured to cross arm 1 using two bolt 215 and nut 220 combinations, is used to support the insulator 160. A U-ring 230 is coupled to the bottom of the plate 200 and is suspended therefrom. The U-ring 230 is coupled to the plate 200 by bolt 241 and nut 237.

It will be appreciated by a person skilled in the art that in addition to the H-frame configuration, the cross arm 1 may be used in many other common transmission line configurations like wishbone, single pole, multipole or Y-frame construction.

The cross arm 1 is made of Glass Fibre Reinforced Polymer (GFRP), which is a polyurethane-based composite that is manufactured using a pultrusion process. The resin of the GFRP is a two component polyurethane resin and the glass is E-glass (Electrical grade glass). E-glass is commonly used in electrical applications in which high insulation, dielectric, fire retardant and high modulus properties are desirable. In one embodiment, the wo component polyurethane resin is Rimline™, which is manufactured by Huntsman™.

In one embodiment, the volume fraction ratio of E-glass (Electrical grade glass) to resin of the GFRP of the cross arm 1 is approximately 53:47. Other ratios are also possible, including volume fraction ratios of E-glass to resin of between 50 and 58: between 50 and 42.

GFRP is a stronger material than timber, which has been used to manufacture cross arms of the prior art, to allow the cross arm 1 provides sufficient strength and durability. GFRP further has an extremely high strength-to-weight ratio so that weight issues relating to field construction are less significant.

Figure 11:
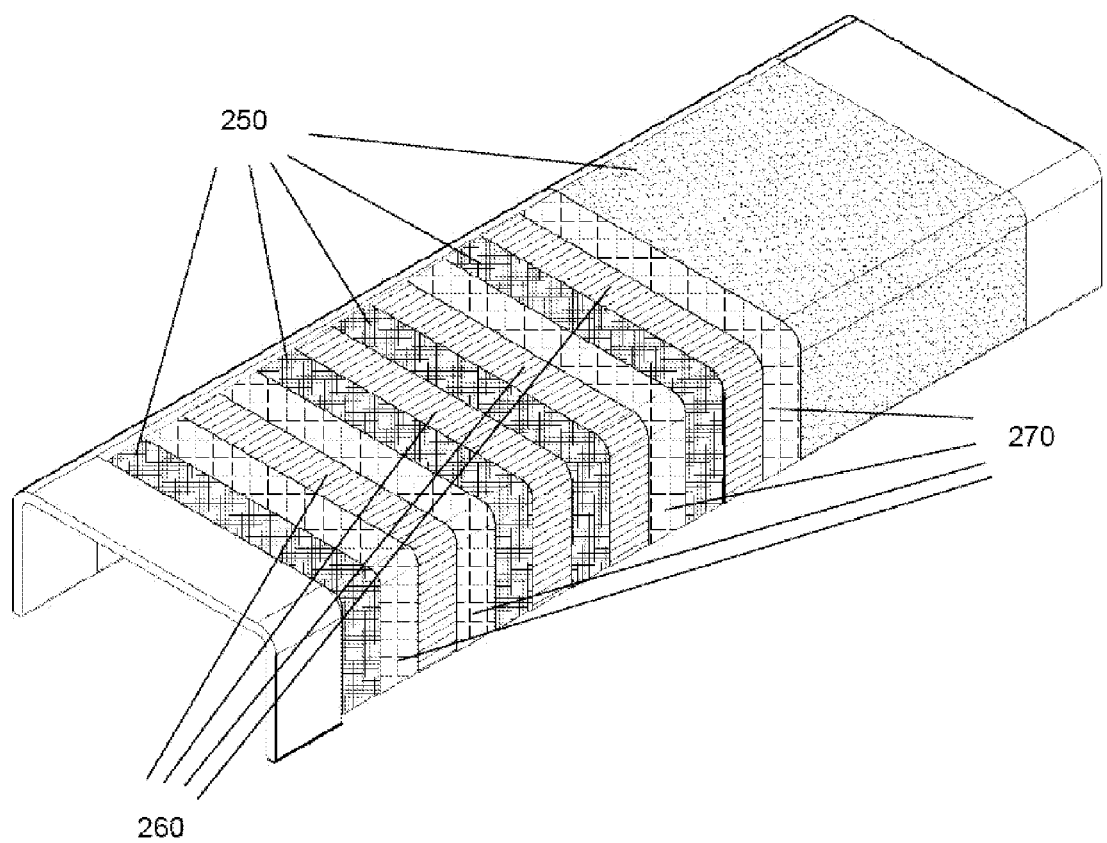
FIG. 11 is an isometric view of a portion of a cross arm according to an embodiment.

As shown in FIG. 11, the cross arm 1 includes different fibreglass layers including: a continuous filament mat 250, unidirectional roving 260 and triax fabric 270. The continuous filament mat 250 includes 1.5 oz/ft$^2$ internal layers and 2.0 oz/ft$^2$ surface layers with polyester veil stitched. The unidirectional roving 260 is 56-yield with approximately 608 total ends. The triax fabric 270 is E-TTXM4008-10 triax fabric including 12 oz/yd$^2$ in each ±45°, 16 oz/yd2 in 90° and 6.75 oz/yd2 chopped mat. The resin may be pigmented to a specified color.

The cross arm 1 further includes a polyester veil that coats the cross arm 1 to provide protection against aging and weathering of the cross arm 1. The GFRP may further be coated with an aliphatic urethane gel coat, a solar reflective clear coat or another suitable coating to provide further protection against aging and weathering. In one embodiment, a single aliphatic polyurethane gel coating is provided for protection against aging and weathering.

In one embodiment, the rovings and mattings of layers 250, 260, 270 may be provided in a longitudinal direction along the length of the cross arm 1. In another embodiment, the strength of the cross arm 1 is customized by altering the mat orientations of one or all of the layers 250, 260, 270. In this embodiment, the rovings and mattings may be provided in a transverse direction relative to the length of the cross arm 1, for example. Alternatively, the strands of the mattings may be provided with an angle of approximately 45 degrees to one another.

In another embodiment, the strength properties of the cross arm 1 may be increased by including an aliphatic polyurethane gel coating. In another embodiment, strength may be increased by deleting some or all of the glass roving or mats and instead including carbon fibres, rovings or mats or titanium fibres, rovings or mats.

The specifications of the GFRP of the cross arm 1 are determined based on the design loadings and structural requirements on the transmission lines in addition to the voltage level. GFRP products may be customized to suit different environmental conditions, such as aging and weathering, UV inhibition and resistance to chemicals, contaminants or corrosives. The customization depends on the user requirements and resins and reinforcement orientation developed accordingly. The suitability of the properties developed ensures that the desired mechanical and physical properties are maintained over a long period. The key factor in developing the crossarm is a knowledge of the specific user requirements, structural finite element modeling to meet those requirements, electrical, mechanical and aging testing to confirm the product performance and field trials to refine the product application.

In one embodiment, a 230 kV H-frame includes a pair of utility poles that are spaced 5.5 m. In this embodiment, the cross arm 1 has dimensions of 14"×6"×½"×38 feet. Suitable strength and durability properties of the cross arm 1 are achieved by customizing the layers 230, 250, 270 and adjusting the two component polyurethane resin to E-glass ratio. The cross arm 1 may be used in many different voltage environments including up to 287 kV, for example.

Cross arm 1 may be manufactured industrially in a controlled environment so that weather conditions do not influence the continuous manufacture of the cross arm 1. Cross arm 1 is easily shipped and can be manufactured in large volumes, with minimal environmental impact, particularly when compared to timber. Installation holes, such as apertures 155, for example, may be pre drilled before delivery.

The cross arm 1 has many advantages over cross arms of the prior art. Fire retardant additives and E-glass are incorporated into the matrix of the glass fibre reinforced polymers, which allow the cross arm 1 to be non-combustible. Further, the cross arm 1 is environmentally benign, meaning that it has no negative impact on the local environment. Cross arm 1 generally has a long life expectancy, of at least 75 years, and therefore a lower life cycle cost when compared to timber or steel, given the cost of replacement. Cross arm 1 can be installed using installation equipment and methods commonly used with prior art cross arms.

Cross arm 1 is electrically non conductive, and can resist harsh weather conditions, for example, cross arm 1 is freeze and thaw resistant, ultra violet light resistant (because of either UV inhibitors incorporated into the resin, or the use of a Polyphatic veil and/or a specific UV resistant clear coat), corrosion resistant, and does not rot or decompose. Also the chemical properties of the resin/glass matrix of cross arm 1 become mechanically and physically stronger as temperatures become colder.

Cross arm 1 also provides several advantages when compared to concrete. GFRPs do not have capillarity porosity. The fibres of the GFRPs provide ductility to cross arm 1 to allow deflection without fracture. In particular, cross arm 1 has superior stress-rupture characteristics and is inherently creep resistant. In addition, GFRP has elastic deformation/memory properties, meaning that once load has been removed from the cross Arm 1, the cross Arm 1 returns to its original "straight line" shape.

A further advantage of the cross arm 1 is that the cross arm 1 fits into existing electrical grids. In addition, the cross arm 1 may be stored outside, which allows cross arms 1 to be purchased in bulk. Cross arm 1 may be colored by adding selected pigmentation to the resin. In one embodiment, a wood color may be selected in order to match a color of the utility poles to which the cross arms 1 are attached. In another embodiment, the cross arms 1 are colored for marketing and/or public acceptance purposes.

Because dirt and other contaminants on cross arms 1 can be a source of electrical conductivity, the cross arm 1 includes smooth and homogeneous surfaces to minimize dirt and contaminant accumulation over time. Wind and rain act as surface cleansers for the cross arm 1. Installation, repair or replacement of cross arm 1 can be done on an energized electrical line because cross arm 1 is not conductive. Cross arm 1 will not risk electrical interference causing partial discharges. Further, based on continuous discharge withstand tests up to 800 kV, cross arm 1 has been shown to withstand lightning strikes. Also as the glass fibre reinforced polymer is not combustible; it will not propagate fire in forest fires. For this reason, the risk from vandalism and fire is minimal. Cross arm 1 will have a weight less than a similarly sized timber cross arms.

Specific embodiments have been shown and described herein. However, modifications and variations may occur to those skilled in the art. All such modifications and variations are believed to be within the scope and sphere of the present embodiments.

The invention claimed is:

1. A structure for supporting a conductor, the structure comprising:
  a transmission class structural cross arm comprising: a pultruded glass fibre reinforced polymer composite C-channel comprising a two-component polyurethane resin and layers of continuous filament mat, unidirectional roving and triax fabric, a mat orientation of the continuous filament mat being one of: longitudinal, transverse and ±45 degrees, glass of the pultruded glass fibre reinforced polymer composite C-channel being E-glass to electrically insulate the transmission class structural cross arm and a volume fraction ratio of the E-glass to the two-component polyurethane resin of the pultruded glass fibre reinforced polymer composite C-channel being between 50 and 58 to between 50 and 42; and
  UV inhibitors incorporated into the two-component polyurethane resin of the pultruded glass fibre reinforced polymer composite C-channel;
  wherein the transmission class structural cross arm is sized to fit into an existing electrical power transmission grid and the continuous filament mat comprises 1.5 oz/ft$^2$ internal layers and 2.0 oz/ft$^2$ surface layers with polyester veil stitched.

2. The structure of claim 1, wherein the unidirectional roving is 56-yield with approximately 608 total ends.

3. The structure of claim 1, wherein the two-component polyurethane resin is colored.

4. The structure of claim 1, wherein the unidirectional roving layers are provided in a longitudinal direction relative to a length of the transmission class structural cross arm.

5. The structure of claim 1, wherein the unidirectional roving layers are provided in a transverse direction relative to a length of the transmission class structural cross arm.

6. The structure of claim 1, wherein the pultruded glass fibre reinforced polymer composite C-channel comprises fire retardant additives.

7. The structure of claim 1, wherein the pultruded glass fibre reinforced polymer composite C-channel comprises a polyester veil coating.

8. The structure of claim 7, wherein UV inhibitors are incorporated into the polyester veil coating of the pultruded glass fibre reinforced polymer composite C-channel.

9. The structure of claim 1, wherein the pultruded glass fibre reinforced polymer composite C-channel comprises a volume fraction ratio of E-glass to resin of approximately 53 to 47.

10. The structure of claim 3, wherein a color of the two-component polyurethane resin-matches a color of a utility pole.

11. A structure for supporting a conductor, the structure comprising:
  a transmission class structural cross arm comprising: a pultruded glass fibre reinforced polymer composite C-channel comprising a two-component polyurethane resin and layers of continuous filament mat, unidirectional roving and triax fabric, a mat orientation of the continuous filament mat being one of: longitudinal, transverse and ±45 degrees, glass of the pultruded glass fibre reinforced polymer composite C-channel being E-glass to electrically insulate the transmission class structural cross arm and a volume fraction ratio of the E-glass to the two-component polyurethane resin of the pultruded glass fibre reinforced polymer composite C-channel being between 50 and 58 to between 50 and 42; and UV inhibitors incorporated into the two-component polyurethane resin of the pultruded glass fibre reinforced polymer composite C-channel;

wherein the transmission class structural cross arm is sized to fit into an existing electrical power transmission grid and the triax fabric is E-TTXM4008-10 triax fabric comprising 12 oz/yd$^2$ in each ±45°, 16 oz/yd$^2$ in 90° and 6.75 oz/yd$^2$ chopped mat.

12. The structure of claim 11, wherein the unidirectional roving is 56-yield with approximately 608 total ends.

13. The structure of claim 11, wherein the two-component polyurethane resin is colored.

14. The structure of claim 11, wherein the unidirectional roving layers are provided in a longitudinal direction relative to a length of the transmission class structural cross arm.

15. The structure of claim 11, wherein the unidirectional roving layers are provided in a transverse direction relative to a length of the transmission class structural cross arm.

16. The structure of claim 11, wherein the pultruded glass fibre reinforced polymer composite C-channel comprises fire retardant additives.

17. The structure of claim 11, wherein the pultruded glass fibre reinforced polymer composite C-channel comprises a polyester veil coating.

18. The structure of claim 17, wherein UV inhibitors are incorporated into the polyester veil coating of the pultruded glass fibre reinforced polymer composite C-channel.

19. The structure of claim 11, wherein the pultruded glass fibre reinforced polymer composite C-channel comprises a volume fraction ratio of E-glass to resin of approximately 53 to 47.

20. The structure of claim 13, wherein a color of the two-component polyurethane resin matches a color of a utility pole.

* * * * *